Figure 1:
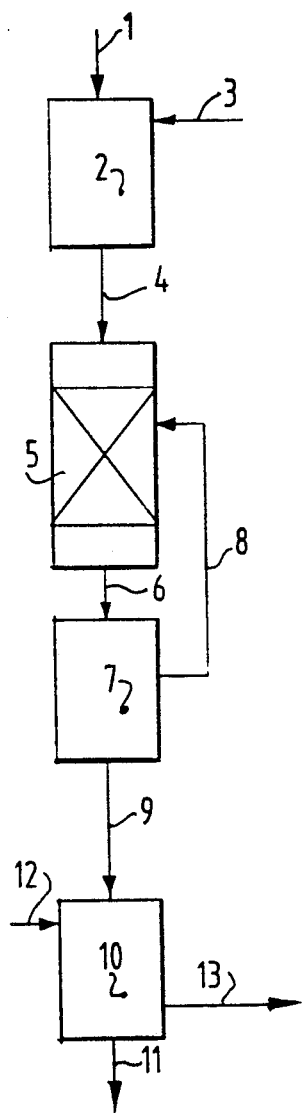

United States Patent [19]

Bleeker

[11] Patent Number: 5,212,077
[45] Date of Patent: May 18, 1993

[54] METHOD FOR THE SYNTHESIS OF ORGANIC COMPOUNDS FROM MANURE

[75] Inventor: Erik D. J. Bleeker, Epe, Netherlands

[73] Assignee: MeMon B.V., Deventer, Netherlands

[21] Appl. No.: 511,458

[22] Filed: Apr. 20, 1990

[30] Foreign Application Priority Data

Mar. 16, 1990 [NL] Netherlands .................. 9000616

[51] Int. Cl.⁵ .................. C12P 13/04; C12P 13/12; C12P 13/08; C12R 1/06
[52] U.S. Cl. .................. 435/113; 435/42; 435/71.1; 435/71.2; 435/106; 435/115; 435/830; 435/832; 435/840; 435/843; 435/859; 435/874
[58] Field of Search .................. 435/42, 71.1, 71.2, 435/106, 113, 115, 830, 840, 848, 874, 832, 843, 859

[56] References Cited

U.S. PATENT DOCUMENTS

| | | | |
|---|---|---|---|
| 3,616,218 | 10/1971 | Shiio et al. | 195/29 |
| 3,687,810 | 8/1972 | Kurihara et al. | 195/29 |
| 3,707,441 | 12/1972 | Shilo et al. | 195/29 |
| 3,825,472 | 7/1974 | Kubota et al. | 195/29 |
| 3,846,558 | 11/1974 | Stevens | 435/804 |
| 3,878,303 | 4/1975 | Hashimoto | 426/56 |
| 3,885,079 | 5/1975 | Haskell et al. | 428/346 |
| 3,905,867 | 9/1975 | Kurimura et al. | 195/28 R |
| 3,959,075 | 5/1976 | Inuzuka et al. | 195/29 |
| 3,973,043 | 8/1976 | Lynn | 435/819 |
| 4,270,974 | 6/1981 | Greenfield et al. | 159/16 S |
| 4,461,777 | 7/1984 | Murase et al. | 426/330.6 |
| 4,526,791 | 7/1985 | Young | 435/911 |
| 4,608,120 | 8/1986 | Greenfield et al. | 159/17.1 |

FOREIGN PATENT DOCUMENTS 0287152 4/1988 European Pat. Off. .

OTHER PUBLICATIONS

"Natuur '89 & Techniek," 57, 894–903 (1989).

Primary Examiner—Herbert J. Lilling
Attorney, Agent, or Firm—Webb, Burden, Ziesenheim & Webb

[57] ABSTRACT

The invention relates to a method for producing an organic compound from manure, including the steps of:
i) concentrating the manure to form a vapor;
ii) condensing said vapor to form a condensate;
iii) adding to said condensate micro-organisms which are capable of producing the organic compound; and
iv) separating from the condensate the organic compound produced by the micro-organisms.

These micro-organisms comprise species of the genera Arthrobacter, Brevibacterium, Corynebacterium, Bacillus, Escherichia, Microbacterium, Micrococcus and Pseudomonas.

7 Claims, 1 Drawing Sheet

METHOD FOR THE SYNTHESIS OF ORGANIC COMPOUNDS FROM MANURE

The present invention relates to a method for the synthesis of organic compounds, such as amino acids, namely L-lysine and L-methionine, from manure.

For the cost-effectiveness of processing processes for manure it is important to separate as many valuable products as possible from the manure. Not only the sale price of these valuable products is of importance but especially also the costs at which these products can be separated from the manure.

In processing processes known to date all attention has been devoted to separating solid matter from the manure, the so-called manure cake, which is a valuable fertilizer after drying.

A first known processing process is the so-called Promest process, wherein the manure is first fermented in a fermentation installation in order to generate biogas. Subsequently separated from the fermented manure are the solids which after drying form a valuable product as manure cake. As a consequence of the fermentation practically all organic compounds are degraded.

A second known processing process is described in the Netherlands patent application 87.00803 wherein bacteria are added to the manure or to a supernatant obtained by liquid-solids separation, which bacteria are capable of using the manure as substrate for the production of amino acids, such as L-lysine and L-methionine. As a result of the complex composition of the substrate or of its supernatant which contains all manner of frequently disturbing organic and inorganic compounds, economically unacceptable high costs are required for recovering the formed amino acids in sufficiently pure form from the manure or the supernatant.

A third known processing process is the so-called Greenfield process (U.S. Pat. Nos. 3,855,079, 4,270,974 and 4,608,120). According to this processing process a non-volatile oil is added to the manure and the oil slurry formed is dehydrated by evaporation under the influence of heat, whereafter oil residues are removed from the formed condensate which can be discharged as effluent after biological treatment. The biogas formed during the biological degradation can be used in the processing process, see further "Natuur en Techniek" 57, 894–903 (1989).

The invention is based on the insight that the manure contains valuable carbon, energy and nitrogen sources which are separable from the manure in relatively pure state via the gas phase, since the carbon source, energy source and nitrogen source can consist substantially of volatile compounds, such as lower fatty acids, namely acetate, and ammoniac. The nitrogen source and the carbon source are further present in practically ideal ratios with respect to the microbial synthesis of amino acids.

Another important advantage for the use of a substrate that is removed from manure via the gas phase is that the condensate is substantially sterilized and particularly clean, namely containing substantially no mineral salts. The condensate can thereby be adapted optimally to the conditions required by the micro-organisms for producing organic compounds such as amino acids.

The invention thus provides a method for the synthesis of organic compounds from manure, comprising of:
i) concentrating the manure;
ii) condensing the formed vapor;
iii) adding to the condensate micro-organisms which are capable of producing the organic compound; and
iv) separating from the condensate the organic compound produced by the micro-organisms.

The condensate can be split by fractional condensation into a first condensate that is relatively rich in ammonia (nitrogen source) and a second condensate relatively rich in organic compounds (carbon source and energy source). Depending on the micro-organisms to be used it is possible to mix both the condensates in varying quantities whereby an optimal carbon/nitrogen ratio is obtained.

The concentration of ammonia in the condensate can be enlarged by concentrating the manure at a comparatively high pH, in general a pH of 5–7, preferably pH 6–7. The increasing of the ammonia content in the condensate involves however a lowering of the fatty acid content in the condensate.

Another further possibility for optimal adaptation of the condensate is the concentrating of the condensate whereby the required reaction volume, the efficiency of the production and the concentration of the organic compound in the condensate and separation of the formed organic compound are improved.

All the above mentioned preferred embodiments indicate that the condensate can be maximally adapted to the conditions required by the micro-organisms for an optimal production of the organic compound.

It is further possible to add special additives to the condensate. In particular can be added minerals and metals such as potassium, phosphate, magnesium, iron and manganese, vitamins, namely biotin and thiamine, a protein source, such as protein hydrolysate, for instance soya, casein or meat extract. A starch source, such as agricultural waste, molasses, whey and the like, can further be added.

Since the conditions required by the micro-organisms for producing the organic compound likewise comprise conditions for allowing growth of the micro-organisms themselves, it can be advantageous to allow the micro-organisms to increase in mass in a separate reactor, whereafter this biomass is used in another reactor to produce the organic compound. The growth medium in the first reactor is preferably an enriched condensate. Therefore according to a variant of the method according to the invention, in a first reactor the micro-organisms are placed in contact with condensate enriched with additives, and biomass of micro-organisms cultivated in the first reactor is brought into contact in a second reactor with condensate that may have been used in the first reactor.

The organic compounds which can be produced are vitamins, such as $B_6$ and $B_{12}$, and amino acids such as L-lysine and/or L-methionine. Known micro-organisms which can produce these amino acids comprise the micro-organism species of the genera Arthrobacter, Brevibacterium, Corynebacterium, Bacillus, Escherichia, Microbacterium, Micrococcus and Pseudomonas, see for example U.S. Pat. Nos. 3,616,218, 3,687,810, 3,707,441, 3,825,472, 3,905,867 and 3,959,075.

The production with micro-organisms of the desired organic compound takes place in the liquid phase at a temperature lying generally between 0° and 70° C., more preferably between 15° and 50° C., such as around 30° C. Although production can take place in loads, it is recommended that the method be performed continuously, wherein a duration time in the reactor is maintained lying between 2 and 250 hours, in general between 5 and 200 hours. The quantity of organic compound produced depends on the conditions but lies for amino acid in general between 0.5–5 g amino acid per gram of ammonia; for instance, with sufficient ammonia in the condensate 80 to 90% of the theoretically maximum feasible fermentation efficiency can be achieved, such as for instance 40 g lysine per liter of condensate. The content of the initially present volatile organic compounds in the condensate, namely acetic acid and propionic acid, decreases herein within 2–3 days to less than 5% of the original content.

It is favorable if prior to concentrating the manure, but still more preferably immediately after the production of the manure, the manure is acidified. On the one hand, premature fermentation and degradation of the desired volatile, organic compounds is thereby avoided, and on the other hand odor problems are reduced and the transition of the volatile, organic compounds to for example the carrier oil used is promoted.

The method according to the invention can be applied to many types of manure, such as manure derived from cattle farms, pig farms, poultry farms and the like. Generally the manure may have a solids content of 7% but the method according to the invention is particularly suitable for manure with a higher solids content, such as preferably at least 10%, and more preferably to more than 14%. The advantage hereby results that in a central manure processing a smaller quantity of manure has to be transported and there results a smaller quantity of condensate with a higher concentration of the desired volatile, organic compounds.

Figure 2:
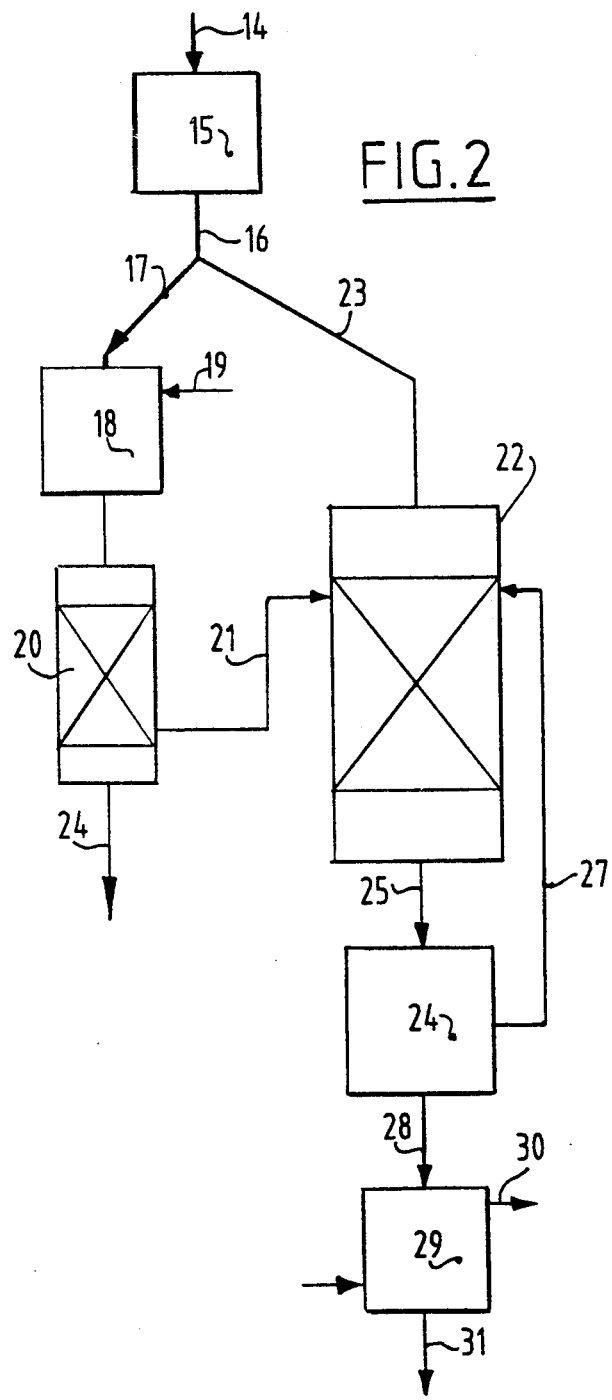

The method according to the invention will be described hereinafter with reference to two embodiments which are focussed on the production of amino acids, namely L-lysine, with suitable micro-organisms, and which are shown schematically as flow diagrams in the FIGS. 1 and 2.

Pig manure from which bulky waste is removed by sieves is subsequently acidified. The acidified manure is mixed with a water insoluble paraffin liquid with a boiling point of circa 180° C. The mixture of manure and paraffin is concentrated in a concentrator, wherein the vapor formed is condensed in a condenser. The condensate 1 is fed to an extractor 2 to which an extraction mixture is fed via the conduit 3. This extraction mixture consists of 40% sec-butyldioctylphosphine oxide and 60% n-dodecane.

A condensate is obtained making use of the Greenfield process. To this end pig slurry manure is acidified and mixed with an oil immiscible with water. This oil-manure mixture is dehydrated by evaporation, whereafter oil residues are removed from the condensate. Depending on the degree of acidification (pH 4.5 to 7) the condensate contained 500 to 3000 ppm ammonia and further 5 to 20 kg/m$^3$ of volatile organic compounds, namely acetic acid, propionic acid, isobutyric acid, butyric acid and isovaleric acid. This condensate is used in the following experiments.

EXPERIMENT 1

The condensate is neutralized to pH 7.2 and used as water phase in the preparing of a known lysine producing medium (LPM-medium). Added to this condensate-medium are lysine producing micro-organisms, whereafter 2 g lysine per liter of medium are produced within 30 hours. At the same time the ammonia concentration falls from 1.3 to 0.3 g/l. If the sugar and ammonia sources are omitted from the LPM-medium, the same lysine production is obtained.

EXPERIMENT 2

Condensate (FIG. 1) is fed via a conduit 1 to a neutralizing device 2. After addition of nutrients via the conduit 3, the mixture is acidified to a pH of 7.2. The acidified concentrate is fed via the conduit 4 to a reactor 5 in which the micro-organisms are immobilized on a carrier such as active carbon and alginate. In the reactor 5 the fermentation of the condensate is performed at a temperature of about 30° C., a pH of 7.2 and under aerobic conditions. The through-flow of the reactor 5 is such that the micro-organisms were substantially not flushed.

Via the conduit 6 the biomass from the reactor 5 is fed to a separating device 7 wherein micro-organisms are separated which are optionally fed back via the conduit 8 to the reactor 5. The effluent is fed via conduit 9 to a unit in which the formed amino acid, in this case L-lysine, is selectively separated. For this purpose the separating unit contains an anion exchanger, for example Amberlite IR-120, in the H-form.

The through-flow is optionally fed via the conduit 11 to a water treatment but can in specific cases be immediately discharged.

The amino acid accumulated in the separating unit 10 is removed therefrom by elution via the elution inlets and outlets 12 and 13. The obtained lysine fraction can if desired be concentrated.

EXPERIMENT 3

Condensate (FIG. 2) is fed via a conduit 14 to a concentration unit 15 in which the substrate is partially concentrated by water extraction. A portion of the concentrated substrate is fed via the conduits 16 and 17 to a neutralizing device 18 to which nutrients are also fed via the conduit 19. The mixture of concentrated condensate and nutrients is neutralized to pH 7.2. The condensate is subsequently fed to a reactor 20 in which micro-organisms are inoculated. Through the specific composition of the condensate the micro-organisms will mainly grow and increase strongly in biomass. The increase in micro-organisms is fed via a conduit 21 to another reactor 22. Further fed to this reactor 22 via the conduits 16 and 23 is concentrated condensate from the concentration device 15. Used condensate that leaves the reactor 20 via the conduit 24 can optionally also be fed to the reactor 22.

In the reactor 22 the condensate serves as substrate for the micro-organisms for the production of the amino acid, namely l-lysine or l-methionine. The mass which leaves the reactor 22 via the conduit 25 is filtered in the separating unit 26 into a biomass fraction which is fed back via the conduit 27 to the reactor 22. The liquid phase is fed via the conduit 28 to the separating unit 29, in which, as described in experiment 2, the produced amino acid is separated and finally discharged via the conduit 30. The exhausted condensate leaves the separating unit 29 via the conduit 31 and is preferably first treated prior to being discharged.

I claim:

1. A method for producing an amino acid compound selected from the group consisting of L-lysine and L-methionine from manure, comprising:
   i) concentrating the manure to form a vapor;
   ii) condensing said vapor to form a condensate;

iii) adding to said condensate specific-amino acid-organic-compound-producing microorganisms are selected from the group consisting of the species of the genera Arthrobacter, Brevibacterium, Corynebacterium, Bacillus, Escherichia, Microbacterium, Micrococcus and Pseudomonas; and iv) separating from the condensate the specific organic compound produced by said specific-amino acid-organic-compound-producing-microorganisms.

2. The method according to claim 1 wherein during said step of condensing said vapor the manure is condensed fractionally to a first ammonia-rich condensate and a second condensate rich in organic compounds.

3. The method according to claim 2 wherein the manure is concentrated at a pH of 5–7.

4. The method according to claim 1 wherein the condensate of step ii) is concentrated.

5. The method as claimed in claim 4 wherein additives are added to the condensate of step ii).

6. The method according to claim 5 wherein said additives are selected from the group consisting of vitamins, metals, minerals and agricultural waste.

7. Method according to claim 1 wherein the condensate of step ii) contains 5–20 g/l of carbon source and 0.5–5 g/l nitrogen source.

* * * * *